(12) United States Patent
Boedo et al.

(10) Patent No.: US 8,037,777 B2
(45) Date of Patent: Oct. 18, 2011

(54) STRUCTURALLY COMPLIANT MICROBEARING DEVICES AND METHODS THEREOF

(75) Inventors: Stephen Boedo, Canandaigua, NY (US); William Grande, Pittsford, NY (US)

(73) Assignee: Rochester Institute of Technology, Rochester, NY (US)

( * ) Notice: Subject to any disclaimer, the term of this patent is extended or adjusted under 35 U.S.C. 154(b) by 811 days.

(21) Appl. No.: 11/200,331

(22) Filed: Aug. 9, 2005

(65) Prior Publication Data

US 2006/0153480 A1    Jul. 13, 2006

Related U.S. Application Data

(60) Provisional application No. 60/621,521, filed on Oct. 22, 2004.

(51) Int. Cl.
  *F16H 55/17* (2006.01)
(52) U.S. Cl. .......................................................... 74/434
(58) Field of Classification Search ............ 74/434–440, 74/443–451; 310/309, 40 MM
See application file for complete search history.

(56) References Cited

U.S. PATENT DOCUMENTS

| | | | | |
|---|---|---|---|---|
| 3,361,004 A | * | 1/1968 | Williams et al. | 74/434 |
| 3,406,583 A | * | 10/1968 | Baier | 74/411 |
| 5,191,251 A | * | 3/1993 | Paratte | 310/309 |
| 5,705,318 A | * | 1/1998 | Mehregany et al. | 430/312 |
| 5,863,008 A | * | 1/1999 | Park | 242/356 |
| 6,392,313 B1 | | 5/2002 | Epstein et al. | |
| 6,472,794 B1 | * | 10/2002 | Shibaike et al. | 310/309 |
| 6,478,539 B1 | * | 11/2002 | Trutschel | 415/223 |
| 6,499,770 B1 | | 12/2002 | Glista et al. | |
| 6,551,083 B2 | | 4/2003 | Weisener et al. | |
| 2002/0096018 A1 | * | 7/2002 | Rodgers et al. | 81/3.33 |
| 2005/0081363 A1 | * | 4/2005 | Malshe et al. | 29/558 |

FOREIGN PATENT DOCUMENTS

GB    2126686    *    3/1984

OTHER PUBLICATIONS

Mehregany et al., "Measurement of Wear in Polysilicon Micromotors," *IEEE Transactions on Electron Devices* 39(5):1136-1143 (1992).
Nagle & Lang, "A Microscale Electric Induction Machine for a Micro Gas Turbine Generator," presented at 27th Annual Meeting of the Electrostatics Society of America, Boston, MA (Jun. 1999) (abstract only).
Sniegowski & Garcia, "Surface-Micromachined Geartrains Driven by an On-Chip Electrostatic Microengine," *IEEE Electron Device Letters* 17(7):366-368 (1996).
Miller et al., "Routes to Failure in Rotating MEMS Devices Experiencing Sliding Friction," *Proc. SPIE Micromachined Devices and Components III*, Austin, 3224:24-30 (Sep. 1997).
Boedo et al., "Modal and Nodal EHD Analysis for Gas Journal Bearings", *ASME*, 127:306-314 (2005).

* cited by examiner

*Primary Examiner* — James Pilkington
(74) *Attorney, Agent, or Firm* — LeClairRyan, a Professional Corporation

(57) ABSTRACT

A microbearing device includes at least one inner bearing structure, at least one outer bearing structure, and one or more fasteners. Each of the one or more fasteners is connected between the inner bearing structure and the outer bearing structure and the inner bearing structure is substantially elastic.

40 Claims, 6 Drawing Sheets

STARTING SUBSTRATE

PATTERN THICK RESIST

BOND TO A "HANDLE" WAFER

DRIE ETCH

RELEASE GEARS

STRUCTURALLY COMPLIANT MICROBEARING DEVICES AND METHODS THEREOF

This application claims the benefit of U.S. Provisional Patent Application Ser. No. 60/621,521, filed Oct. 22, 2004, which is herein incorporated by reference in its entirety.

The subject invention was made with government support from NASA, Grant Number NASA NAG 13-02051. The U.S. Government may have certain rights.

FIELD OF THE INVENTION

This invention generally relates to micromachines and, more particularly, to structurally compliant microbearing devices and methods thereof.

BACKGROUND

Initial fabrication requirements for micromachines, such as microactuators, micropumps, and microengines, were focused on structural robustness, such as mechanical yielding and fracture strength. The development of improved silicon-based materials and techniques to evaluate their properties at the microscale have mitigated to some extent the concern of structural integrity as a critical design factor in micromachines. As a result, micromachines with satisfactory fatigue strength have been fabricated as disclosed in M. Mehregany, S. D. Senturia, and J. H. Lang, "Measurement of Wear in Polysilicon Micromotors," IEEE Transactions on Electron Devices, Vol. 39, No. 5, 1992, pp. 1136-1143, S. F. Nagle and J. H. Lang, "A Microscale Electric Induction Machine for a Micro Gas Turbine Generator," presented at 27th Annual Meeting of the Electrostatics Society of America, Boston, Mass., June 1999, and J. Sniegowski and E. Garcia, "Surface-Micromachined Geartrains Driven by an On-Chip Electrostatic Microengine," IEEE Electron Device Letters, vol. 17, no. 7, 1996, p. 366.

Unfortunately, as problems with structural robustness were being addressed, other problems with the bearing surfaces in these micromachines become apparent. More specifically, the operation of moving bearing surfaces in micromachines at extremely high relative velocities resulted in high rates of wear micromachines at extremely high relative velocities resulted in high rates of wear and early seizure of the bearing surfaces. By way of example, this type of wear damage resulted in an undesirable gap between a bearing surface and a shaft as illustrated in FIG. 1 and disclosed in S. L. Miller, G. LaVigne, M. S. Rodgers, J. J. Sniegowski, J. P. Waters, and P. J. McWhorter, "Routes to Failure in Rotating MEMS Devices Experiencing Sliding Friction," Proc. SPIE Micromachined Devices and Components III, Vol. 3224, Austin, September 1997, pp. 24-30.

To understand the cause of this wear and early seizure requires an understanding of the forces being applied to these bearing surfaces. As a load is transmitted from one bearing surface to the other, a gas or liquid film is squeezed or wedged between the deforming and moving surfaces, creating film pressure and surface shear tractions which attempt to keep the surfaces separated. The film pressure in turn induces structural deformation of the interacting surfaces. The ways in which bearing structural deformation interacts with lubricant film behavior is often referred to as elastohydrodynamic lubrication (EHL).

Bearing wear is induced between opposing surfaces through the contact behavior of surface asperities. In the absence of a gas or liquid lubricant, the asperities need to carry the entire load, and high wear rates can only be controlled through the development of surface coatings or treatments. When gas or liquids are available, load can be carried through the wedging and squeezing action of the entraining surfaces, and thus only a small percentage of the load is needed to be carried by asperity interaction. When gas or liquid films become larger than approximately three times the standard deviation of combined surface roughness, the probability of asperity interaction is very low and observed wear is practically nonexistent, regardless of surface morphology. This so-called full-film EHL condition is the optimal design target for lubricated bearing systems.

Unfortunately, this optimal design target for bearing systems with rigid surfaces can not always be achieved so wear damage and early seizures of these bearing systems continue. Efforts have been made to develop surface treatments to the rigid surfaces of these bearing systems, but these efforts have met with limited success.

SUMMARY

A microbearing device in accordance with embodiments of the present invention includes at least one inner bearing structure, at least one outer bearing structure, and one or more fasteners. Each of the one or more fasteners is connected between the inner bearing structure and the outer bearing structure and the inner bearing structure is substantially elastic.

A method of making a microbearing device in accordance with embodiments of the present invention includes forming at least one inner bearing structure, forming at least one outer bearing structure, and forming one or more fasteners. Each of the fasteners is connected between the inner bearing structure and the outer bearing structure and the inner bearing structure is formed to be substantially elastic.

A bearing device in accordance with embodiments of the present invention includes at least one inner ring which is at least partially continuous, at least one outer ring which is at least partially continuous, one or more fasteners. Each of the one or more of the fasteners is connected between the inner ring and the outer ring. The inner ring is substantially elastic and each of the inner ring, the outer ring and the one or more of the fasteners have dimensions less than about 2000 µm.

A method of making a microbearing device in accordance with embodiments of the present invention includes forming at least one inner ring which is at least partially continuous, forming at least one outer ring which is at least partially continuous, and forming one or more fasteners. Each of the one or more of the fasteners is connected between the inner ring and the outer ring. At least the inner ring is formed to be substantially elastic and each of the inner ring, the outer ring and the one or more of the fasteners have dimensions less than about 2000 µm.

The present invention provides a number of advantages including providing microbearing devices which reduce wear and early seizure of bearing surfaces. The present invention employs a geometry and structural elasticity at the microscale that takes advantage of the presence of air or liquid films to promote full-film EHL performance in the microbearing. Further, the present invention is easy to manufacture and results in highly durable microbearing devices suitable for numerous applications, including for microturbines and associated micropower systems, micropumps for lab-on-chip systems, rotational gratings for light polarization, and microgears for miniature transmission systems.

Figure 1:
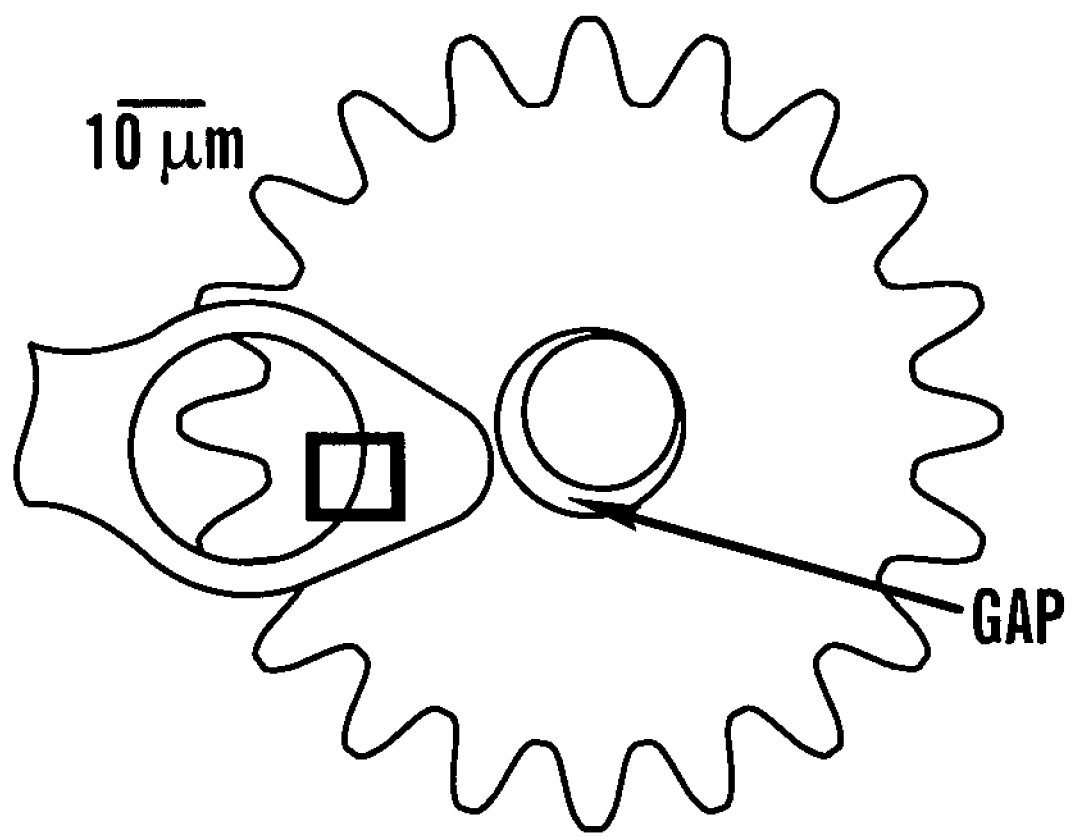
FIG. 1 is a diagram of a top view of a prior microgear with wear damage.
Figure 2:
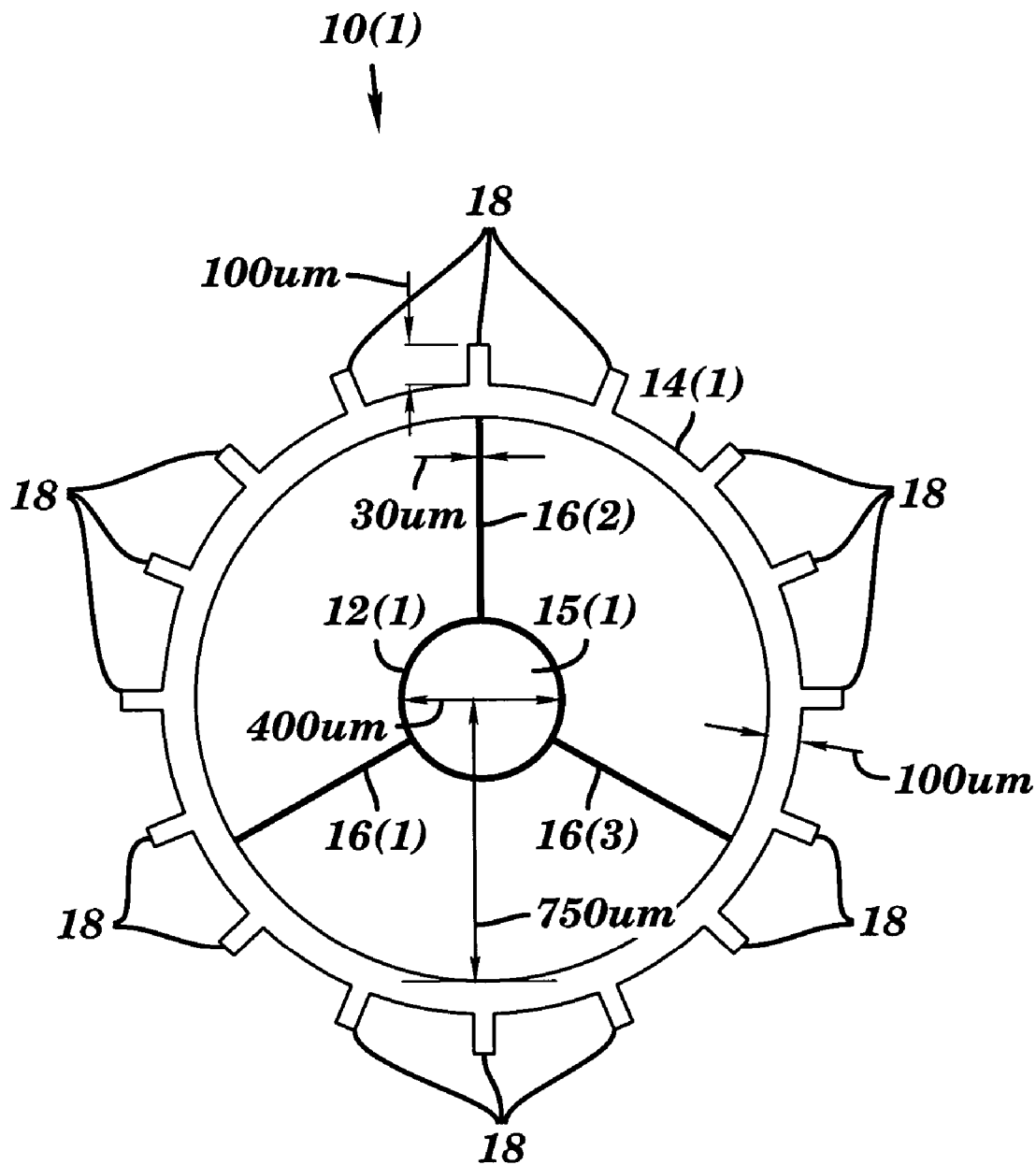
FIG. 2 is a top view of a complaint rotor with radial fasteners in accordance with embodiments of the present invention.

DETAILED DESCRIPTION microbearing device 10(1) in accordance with embodiments of the present invention is illustrated in FIG. 2. The microbearing device 10(1) includes an inner ring 12(1), an outer ring 14(1), fasteners 16(1)-16(3), and gear teeth 18, although the microbearing device 10(1) can comprise other numbers and types of components in other configurations. The present invention relates to microbearing devices with dimensions less than approximately 2000 microns. The present invention provides a number of advantages including providing compliant microbearing devices which alleviate problems relating to high wear rates, early seizure, and stiction.

Referring more specifically to FIG. 2, the inner sleeve 12(1) has a ring shape which extends completely around a hollow center 15(1), although the inner sleeve 12(1) could have other shapes and configurations, such as a tubular shape which extends around only a portion of the hollow center 15, and other types of inner bearing structures could be used. The inner sleeve 12(1) has a diameter of about 400 µm and a thickness of about 30 µm so that the inner sleeve 12(1) has structural elasticity, although the inner sleeve 12(1) can have other dimensions as long as the inner sleeve 12(1) is substantially elastic to allow for deformation during use. The inner sleeve 12(1) is made of silicon, although the inner sleeve 12(1) could be made of other materials. The hollow center 15(1) of the inner sleeve 12(1) is designed to receive a shaft on which the inner sleeve 12(1) rotates, although the inner sleeve 12(1) could be mounted on other devices for rotation. The bearing land length is defined as the depth or length of the inner surface of the inner sleeve 12(1).

The outer ring 14(1) has a ring shape which extends completely around and is spaced out from the inner sleeve 12(1), although the outer ring 14(1) could have other shapes and configurations, such as a tubular shape which extends around only a portion of and is spaced out from the inner sleeve 12(1), and other types of outer bearing structures could be used. The outer ring 14(1) has a radius of about 750 µm and a thickness of about 100 µm so that the outer ring 14(1) is substantially rigid, although the outer ring 14(1) could have other dimensions and could be substantially elastic. The outer ring 14(1) is made of silicon, although the outer ring 14(1) could be made of other materials which are the same or different from the materials used for the inner sleeve 12(1).

Fasteners 16(1)-16(3) are each connected at one end to an outer surface of inner sleeve 12(1) and at another end to an inner surface of the outer ring 14(1) and extend in a radial direction out from the inner sleeve 12(1), although other numbers of fasteners connected in other manners could be used. Each of the fasteners 16(1)-16(3) has length of about 550 µm and a width of about 30 µm so that each of the fasteners 16(1)-16(3) is substantially elastic, although each of the fasteners 16(1)-16(3) could have other dimensions and configurations. Additionally, each of the fasteners 16(1)-16(3) has a substantially straight shape, although one or more of the fasteners 16(1)-16(3) could have other shapes. The straight fasteners 16(1)-16(3) allow local flexibility of the inner sleeve 12(1) while providing structural stability to translational motion of the outer ring 14(1) relative to the inner sleeve 12(1). The fasteners 16(1)-16(3) are elastic enough to isolate the deflection characteristics of the inner sleeve 12(1), while being rigid enough to transmit the load from the external environment on the outer ring 14(1) to the inner sleeve 12(1). The fasteners 16(1)-16(3) are made of silicon, although the fasteners 16(1)-16(3) could be made of other materials which are the same or different from the materials used for the inner sleeve 12(1) and/or outer ring 14(1).

A plurality of blades 18 extend out from the outer surface of the outer ring 14(1), although the outer surface of the outer ring 14(1) may have other numbers of blades or other structures, such as gear teeth, and could extend in other directions and configurations. The blades 18 enable the microbearing device 10(1) to function as a microturbine, micropump, or microgear, although the microbearing device 10(1) could be configured for other applications. The blades 18 are made of silicon, although the blades 18 could be made of other materials which are the same or different from the materials used for the inner sleeve 12(1), the outer ring 14(1), and/or the fasteners 16(1)-16(3).

Figure 3:
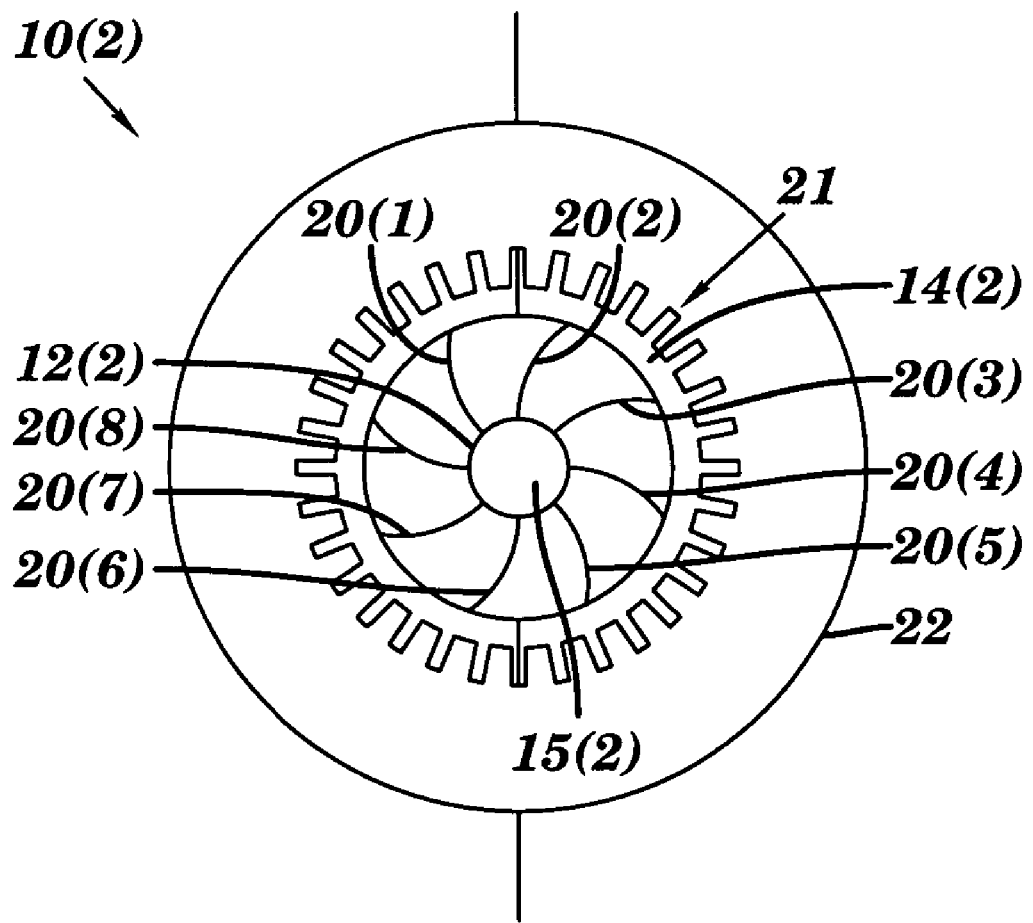
FIG. 3 is a top view of a complaint rotor with spiral shaped fasteners in a housing in accordance with other embodiments of the present invention.

The microbearing device 10(2) shown in FIG. 3 is identical to the microbearing device 10(1) shown in FIG. 2, expect as described herein. Elements in FIG. 3 which are like those shown in FIG. 2 will have like reference numerals.

In this embodiment, the inner sleeve 12(2) also has a ring shape which extends completely around a hollow center 15, although the inner sleeve 12(2) could have other shapes and configurations, such as a tubular shape which extends around only a portion of the hollow center 15, and other types of inner bearing structures could be used. The inner sleeve 12(2) has a diameter of about 400 µm and a thickness of about 30 µm so that the inner sleeve 12(2) has structural elasticity, although the inner sleeve 12(2) can have other dimensions as long as the inner sleeve 12(2) is substantially elastic to allow for deformation during use. The inner sleeve 12(2) is made of silicon, although the inner sleeve 12(2) could be made of other materials. The hollow center 15 of the inner sleeve 12(2) is designed to receive a shaft on which the inner sleeve 12(2) rotates, although the inner sleeve 12(2) could be mounted on other devices for rotation. The bearing land length is defined as the depth or length of the inner surface of the inner sleeve 12(2).

The outer ring 14(2) has a ring shape which extends completely around and is spaced out from the inner sleeve 12(2), although the outer ring 14(2) could have other shapes and configurations, such as a tubular shape which extends around only a portion of and is spaced out from the inner sleeve 12(2), and other types of outer bearing structures could be used. The outer ring 14(2) has a radius of about 750 µm and a thickness of about 100 μm so that the outer ring 14(2) is substantially rigid, although the outer ring 14(2) could have other dimensions and could be substantially elastic. The outer ring 14(2) is made of silicon, although the outer ring 14(2) could be made of other materials which are the same or different from the materials used for the inner sleeve 12(2).

Fasteners 20(1)-20(8) are each connected at one end to an outer surface of inner sleeve 12(2) and at another end to an inner surface of the outer ring 14(2), although other numbers of fasteners connected in other manners could be used. Each of the fasteners 20(1)-20(8) has length of about 200 μm and a width of about 10 μm so that each of the fasteners 20(1)-20(8) is substantially elastic, although each of the fasteners 20(1)-20(8) could have other dimensions. Additionally, each of the fasteners 20(1)-20(8) has a substantially spiral shape and is secured in direction of intended travel of the outer ring 14(2) to be configured to absorb any deformations, although one or more of the fasteners 20(1)-20(8) could have other shapes. The spiral shaped fasteners 20(1)-20(8) allow the inner sleeve 12(2) to deform freely with minimal interference from the constraints of the fasteners 20(1)-20(8). The fasteners 20(1)-20(8) are elastic enough to isolate the deflection characteristics of the inner sleeve 12(2), while being rigid enough to transmit the load from the external environment on the outer ring 14(2) to the inner sleeve 12(2). A mode shape analysis technique described in detail by S. Boedo and J. F. Booker, "Modal and Nodal EHD Analysis for Gas Journal Bearings," ASME Journal of Tribology, vol. 127, 2005, pp. 306-314, which is herein incorporated by reference in its entirety, can be used to quantify the difference in elasticity between the inner sleeve, fasteners, and the outer ring in the microbearing devices 10(1) and 10(2). The fasteners 20(1)-20(8) are made of silicon, although the fasteners 20(1)-20(8) could be made of other materials which are the same or different from the materials used for the inner sleeve 12(2) and/or outer ring 14(2).

A plurality of gear teeth 21 extend out from the outer surface of the outer ring 14(2), although the outer surface of the outer ring 14(2) may have other numbers of blades or other structures, such as gear teeth, and could extend in other directions and configurations. The gear teeth 21 enable the microbearing device 10(1) to function as a microturbine, micropump, or microgear, although the microbearing device 10(1) could be configured for other applications. The gear teeth 21 are made of silicon, although the blades could be made of other materials which are the same or different from the materials used for the inner sleeve 12(2), the outer ring 14(2), and/or the fasteners 20(1)-20(8).

The operation of the microbearing device 10(1) will now be described with reference to FIGS. 2, 4, and 5. The hollow center 15(1) of the inner sleeve 12(1) is mounted on a shaft or structure for rotation. A fluid, a liquid(s) or gas(es), such as air, strikes one or more of the blades 18 causing the outer ring 14(1) to move, although the outer ring 14(1) could be engaged to move in other manners, such as by another structure striking one or more of the blades 18. This rotational motion of the outer ring 14(1) is translated by the fasteners 16(1)-16(3) to the inner ring 12(1) which rotates about the shaft seated in the hollow center 15(1). The straight shape of the fasteners 16(1)-16(3) provides a greater restriction on the translational motion of the outer ring 14(1) compared with using spiral shaped fasteners, such as the spiral shaped fasteners 20(1)-20(8). As explained in greater detail below, the structural elasticity of the inner ring 12(1) makes the microbearing device 10(1) more resistant to wear and early seizure.

Figure 4:
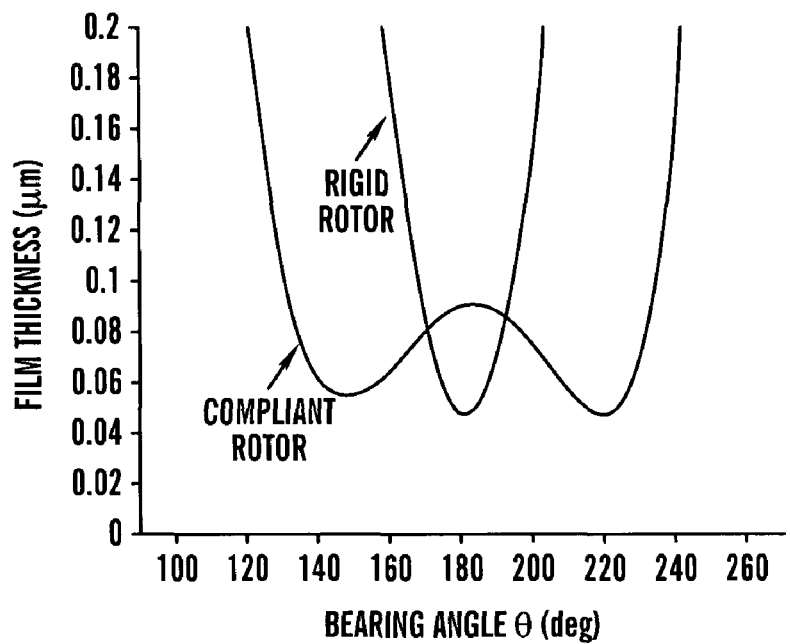
FIG. 4 is a graph of film thickness distribution along a bearing midplane for a prior rigid microbearing device and a compliant microbearing device in accordance with embodiments of the present invention.
Figure 5:
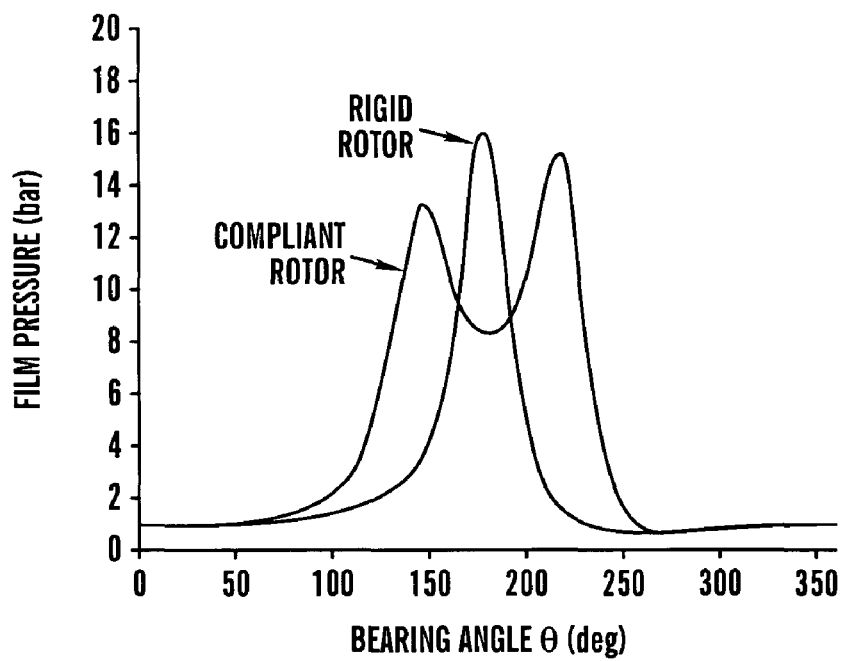
FIG. 5 is a graph of pressure distribution along a bearing midplane for a prior rigid microbearing device and a compliant microbearing device in accordance with embodiments of the present invention.

As shown in the graphs in FIGS. 4-5, the performance of the microbearing device 10(1) is enhanced because of the surface deformation of the compliant inner ring 12(1). The elastic "pinching" action of the compliant inner ring 12(1) allows for the formation of a small pocket of air, causing a bimodal peak pressure distribution. The constrained fluid, a liquid(s) or gas(es), such as air, in the pocket effectively spreads out the load carrying region over a larger contact area of the bearing surface. This allows for a larger resultant load for the specified minimum film thickness and also reduces wear and early seizures. In contrast, the prior rigid bearing is limited by cylindrical geometry to produce a single pressure peak. This results in a substantially smaller load capacity for the same minimum film thickness and much greater wear and more frequent early seizures.

The operation of the microbearing device 10(2) shown in FIG. 3 is identical to the operation of the microbearing device 10(1) shown in FIG. 2, expect as described herein. The hollow center 15(2) of the inner sleeve 12(2) is also mounted on a shaft or other structure for rotation. Another structure, such as gear teeth, strike one or more of the gear teeth 21 causing the outer ring 14(2) to move, although the outer ring 14(2) could be engaged to move in other manners, such as by a fluid striking one or more of the gear teeth 21. This rotational motion of the outer ring 14(2) is translated by the fasteners 20(1)-20(8) to the inner ring 12(2) which rotates about the shaft seated in the hollow center 15(2). As explained in greater detail below, the structural elasticity of the inner ring 12(2) makes the microbearing device 10(2) more resistant to wear and early seizure.

As shown in the graphs in FIGS. 4-5, the performance of the microbearing device 10(2) is enhanced because of the surface deformation of the compliant inner ring 12(2) in the same manner as the performance of the microbearing device 10(1) is enhanced because of the surface deformation of the compliant inner ring 12(1) described earlier.

Figure 6A:
FIGS. 6A, 6B, 6D, and 6E are cross-sectional, side views and 6C is a cross-sectional top view of a method of forming a housing assembly for a microbearing device in accordance with embodiments of the present invention.

Referring to FIGS. 6A-6E, a method for making a housing assembly 30 for the microbearing devices 10(1) and 10(2) is illustrated, although the housing assembly 30 could be made in other manners and the microbearing devices 10(1) and 10(2) can be used with other devices and structures. A starting substrate 32 having a diameter of about 100 mm and a minimum thickness of about 0.5 mm and made of silicon is provided as shown in FIG. 6A, although other dimensions and materials could be used for substrate 32.

Figure 6B:
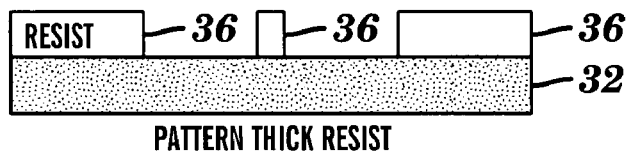
Figure 6C:
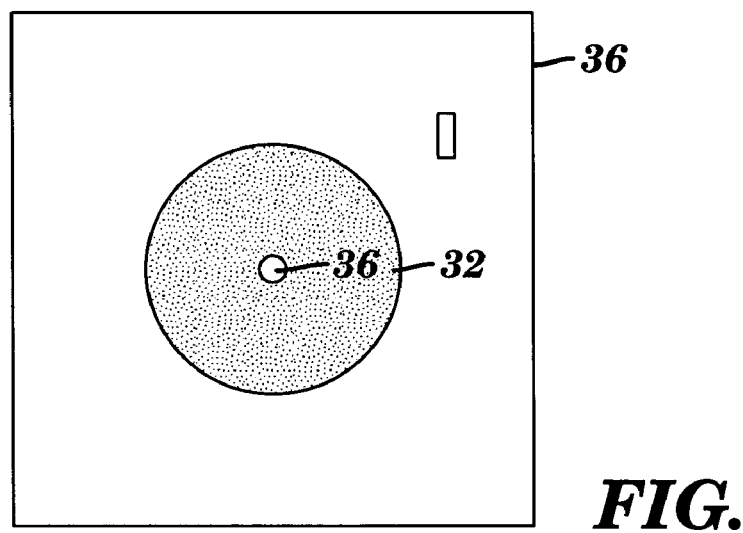
Figure 6D:
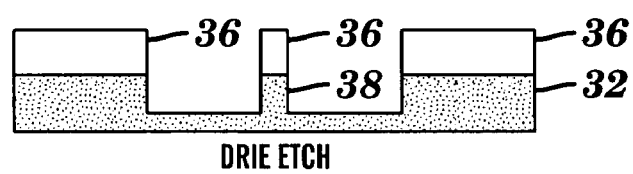

Next, a resist material 36 is deposited to cover an entire surface of the substrate 32, although the resist material 36 could be deposited in other manners. The resist material 36 is etched into the desired pattern on the substrate 32 as shown in FIGS. 6B and 6C, although the resist material 36 can be formed into the desired pattern in other manners.

Once the resist material 36 is deposited, exposed and developed in the desired pattern, a deep reactive ion etching (DRIE) tool is used to etch into the exposed portions of the substrate 32, although other manners of forming the pattern in the resist material 36 could be used. In this example, the depth of the etching is about 0.40-0.45 mm, although the substrate 32 could be etched to other depths. This etching of the substrate 32 forms the housing assembly 30 with the shaft 38 on which the hollow center of 15(1) of inner ring 12(1) or the hollow center 15(2) of the inner ring 12(2) can be rotatably mounted.

Figure 6E:

Next, the remaining resist material 36 is stripped from the substrate 32 as shown in FIG. 6E. In this example, a single substrate 32 in the form of a standard 4 inch diameter silicon wafer can be used to form approximately ten to fifteen housing assemblies 30 which are ready to be sawn into separate housing assemblies, although other numbers of housing assemblies can be formed on each substrate 32.

Figure 7A:
FIGS. 7A, 7B, and 7D-7F are cross-sectional, side views and 7C is a cross-sectional top view of a method of forming a microbearing device in accordance with embodiments of the present invention.
Figure 7B:
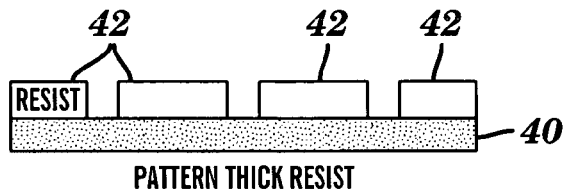

Referring to FIGS. 7A-7F, a method for making the microbearing devices 10(1) is illustrated, although the microbearing devices 10(1) could be made in other manners. A starting substrate 40 having a diameter of about 100 mm and a minimum thickness of about 0.30-0.35 mm and made of silicon is provided as shown in FIG. 7A, although other dimensions and materials could be used for substrate 40.

Figure 7C:
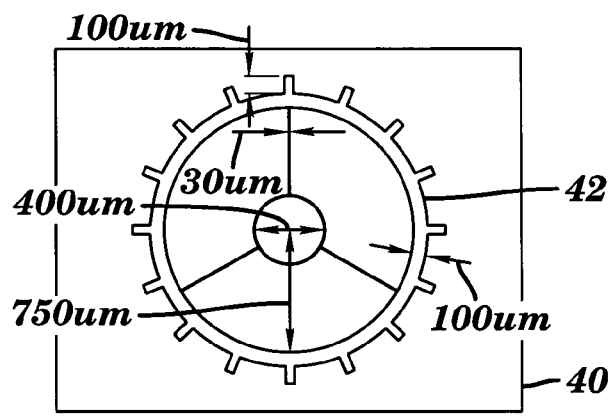

Next, a resist material 42 is deposited to cover an entire surface of the substrate 40, although the resist material 42 could be deposited in other manners. The resist material 42 is deposited, exposed and developed into the desired pattern shown in black in FIG. 7C with the exposed substrate shown in white, although the resist material 42 can be formed into the desired pattern in other manners. Simply for ease of illustration, the complicated etch pattern shown in FIG. 7C is not illustrated in the cross-sectional views shown in FIGS. 7B and 7D-7F and only a few examples of what etch openings would look like for the exposed portion of the substrate 40 are illustrated in FIGS. 7B and 7D-7F.

Figure 7D:
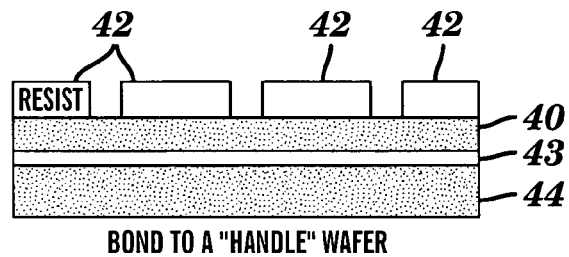
Figure 7E:
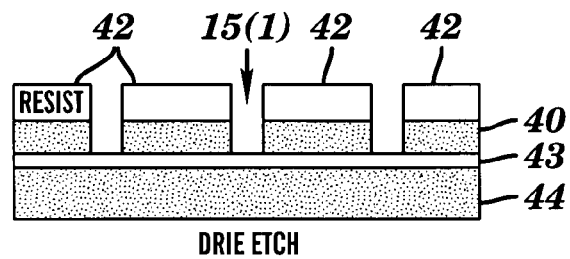

Next, as shown in FIG. 7D a handle wafer 44 is bonded to an opposing surface of the substrate 40 from the resist material 42 using a photoresist material 43 as an adhesive, although the handle wafer 44 could be attached with other materials and in other manners. The photoresist material 43 acts as an etch stop for the DRIE process and holds the features of the microbearing device 10(1) in place once the substrate 40 is etched completely through as shown in FIG. 7E. Otherwise, features of the microbearing device 10(1) could be lost in the DRIE etching process.

Figure 7F:
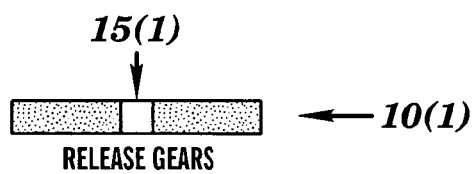

Next, a DRIE tool is to etch into the exposed portions of the substrate 40 as shown FIG. 7E, although other manners of removing the exposed substrate 40 could be used. In this example, the depth of the etching is about 0.40-0.45 mm and extends though the substrate 40 and stops at the photoresist material 43 which acts as an etch stop, although etching could go to other depths. This etching of the substrate 40 forms the microbearing device 10(1) which at this point in the process is still bonded to the handle wafer 44. Next, the remaining resist material 42 is stripped from the substrate 44 as shown in FIG. 7F. Soaking in acetone removes the photoresist material 43 and frees the microbearing device 10(1), although other manners for releasing the microbearing device 10(1) could be used.

Standard surface micromachining processes, such as those provided by commercially available Sandia Ultra-planar Multi-level MEMS Technology (SUMMIT) and Multi-User MEMS Processes (MUMPS) can yield maximum bearing land lengths of approximately 50 microns. The process described herein can yield substantially larger bearing land lengths on the order of 500 microns. Such an increase allows for comparatively larger bearing contact surfaces and higher load capacities.

The method of manufacturing the microbearing device 10(2) is the same as the method of manufacturing the microbearing device 10(1), except that the pattern etched into the resist material 42 and the substrate 44 will be different to form the microbearing device 10(2).

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed:

1. A microbearing device comprising:
    at least one inner bearing structure having an inner surface shaped and sized to freely rotate about a shaft;
    at least one outer ring; and
    one or more fasteners, with each of the one or more fasteners connected between the inner bearing structure and the outer ring,
    wherein the inner bearing structure has a structural elasticity that creates a bimodal peak pressure distribution by a formation of a pocket of constrained fluid over a contact area of a surface of the microbearing device in response to rotational motion of the at least one outer ring while continuing to rotate on the shaft.

2. The device as set forth in claim 1 wherein the outer ring has a thickness which is greater than a thickness of the inner bearing structure.

3. The device as set forth in claim 2 wherein the inner bearing structure, the outer ring, and the fasteners are made out of the substantially the same material.

4. The device as set forth in claim 1 wherein the one or more of the fasteners comprise a plurality of the fasteners which are equidistantly spaced apart between the at least one inner bearing structure and the at least one outer ring and each of the fasteners has a substantially straight shape between ends with one of the ends directly connected to the at least one inner bearing structure and the other one of the ends directly connected to the at least one outer ring.

5. The device as set forth in claim 1 wherein the one or more of the fasteners comprise a plurality of the fasteners which are equidistantly spaced apart between the at least one inner bearing structure and the at least one outer ring and each of the fasteners has a substantially spiral configuration between ends with one of the ends directly connected to the at least one inner bearing structure and the other one of the ends directly connected to the at least one outer ring.

6. The device as set forth in claim 1 further comprising one or more blades extending out from an outer surface of the outer ring.

7. The device as set forth in claim 1 further comprising one or more gear teeth extending out from an outer surface of the outer ring.

8. The device as set forth in claim 7, wherein the one or more gear teeth are configured to move the at least one outer ring upon being struck by a fluid.

9. The device as set forth in claim 1 wherein the at least one inner bearing structure has an inner periphery with a circular shape.

10. A method of making a microbearing device, the method comprising:
    forming at least one inner bearing structure having an inner surface shaped and sized to freely rotate about a shaft;
    forming at least one outer ring; and
    forming one or more fasteners, with each of the fasteners connected between the inner bearing structure and the outer ring,
    wherein the inner bearing structure has a structural elasticity that creates a bimodal peak pressure distribution by a formation of a pocket of constrained fluid over a contact area of a surface of the microbearing device in response to rotational motion of the at least one outer bearing while continuing to rotate on the shaft.

11. The method as set forth in claim 10 wherein the forming the outer ring further comprises forming the outer ring to have a thickness which is greater than a thickness of the inner bearing structure.

12. The method as set forth in claim 10 wherein the inner bearing structure, the outer ring, and the fasteners are made out of the substantially the same material.

13. The method as set forth in claim 10 wherein the forming the one or more of the fasteners further comprises forming a plurality of the fasteners which are equidistantly spaced apart between the at least one inner bearing structure and the at least one outer ring and each of the fasteners has a substantially straight shape between ends with one of the ends directly connected to the at least one inner bearing structure and the other one of the ends directly connected to the at least one outer ring.

14. The method as set forth in claim 10 wherein the forming the one or more of the fasteners further comprises forming a plurality of the one or more of the fasteners which are equidistantly spaced apart between the at least one inner bearing structure and the at least one outer ring and each of the fasteners has a substantially spiral shape between ends with one of the ends directly connected to the at least one inner bearing structure and the other one of the ends directly connected to the at least one outer ring.

15. The method as set forth in claim 10 further comprising forming one or more blades that extends out from an outer surface of the outer ring.

16. The method as set forth in claim 10 further comprising forming one or more gear teeth extending out from an outer surface of the outer ring.

17. The method as set forth in claim 16, wherein the one or more gear teeth are configured to move the at least one outer ring upon being struck by a fluid.

18. The method as set forth in claim 10 wherein the forming the inner bearing structure, forming the outer ring and forming the one or more of the fasteners further comprises etching the inner bearing structure, outer ring, and the one or more of the fasteners from a substrate.

19. The method as set forth in claim 10 further comprising forming a housing assembly with a shaft on which the inner ring is seated for rotational movement within the housing assembly.

20. The method as set forth in claim 10 wherein the forming at least one inner bearing structure further comprises forming the at least one inner bearing structure to have an inner periphery with a circular shape.

21. A microbearing device comprising:
    at least one inner bearing which is at least partially continuous and has an inner surface shaped and sized to freely rotate about a shaft;
    at least outer ring which is at least partially continuous; and
    one or more fasteners, with each of the one or more of the fasteners connected between the inner bearing and the outer ring,
    wherein the inner bearing structure has a structural elasticity that creates a bimodal peak pressure distribution by a formation of a pocket of constrained fluid over a contact area of a surface of the microbearing device in response to rotational motion of the at least one outer ring while continuing to rotate on the shaft and wherein each of the inner bearing, the outer ring and the one or more of the fasteners have dimensions less than 2000 μm.

22. The device as set forth in claim 21 wherein the outer ring has a thickness which is greater than a thickness of the inner bearing.

23. The device as set forth in claim 21 wherein the inner bearing, the outer ring, and the one or more of the fasteners are made out of the substantially the same material.

24. The device as set forth in claim 21 wherein the one or more of the fasteners further comprise a plurality of the fasteners which are equidistantly spaced apart between the at least one inner bearing and the at least one outer ring and each of the fasteners has a substantially straight shape between ends with one of the ends directly connected to the at least one inner bearing and the other one of the ends directly connected to the at least one outer ring.

25. The device as set forth in claim 21 wherein the one or more of the fasteners further comprise a plurality of the fasteners which are equidistantly spaced apart between the at least one inner bearing and the at least one outer ring and each of the fasteners has a substantially spiral shape between ends with one of the ends directly connected to the at least one inner bearing and the other one of the ends directly connected to the at least one outer ring.

26. The device as set forth in claim 21 further comprising one or more blades extending out from an outer surface of the outer ring.

27. The device as set forth in claim 21 further comprising one or more gear teeth extending out from an outer surface of the outer ring.

28. The device as set forth in claim 27, wherein the one or more gear teeth are configured to move the at least one outer ring upon being struck by a fluid.

29. The device as set forth in claim 21 wherein the at least one inner bearing has an inner periphery with a circular shape.

30. A method of making a microbearing device, the method comprising:
    forming at least one inner bearing which is at least partially continuous and has an inner surface shaped and sized to freely rotate about a shaft;
    forming at least one outer ring which is at least partially continuous; and
    forming one or more fasteners, with each of the one or more of the fasteners connected between the inner bearing and the outer ring,
    wherein the inner bearing has a structural elasticity that creates a bimodal peak pressure distribution by a formation of a pocket of constrained fluid over a contact area of a surface of the microbearing device in response to rotational motion of the at least one outer ring while continuing to rotate the shaft and wherein each of the inner bearing, the outer ring and the one or more of the fasteners have dimensions less than 2000 μm.

31. The method as set forth in claim 30 wherein the forming the outer ring further comprises forming the outer ring to have a thickness which is greater than a thickness of the inner bearing.

32. The method as set forth in claim 30 wherein the inner bearing, the outer ring, and the fasteners are made out of the substantially the same material.

33. The method as set forth in claim 30 wherein the forming the one or more of the fasteners further comprises forming a plurality of the fasteners which are equidistantly spaced apart between the at least one inner bearing and the at least one outer ring and each of the fasteners has a substantially straight shape between ends with one of the ends directly connected to the at least one inner bearing and the other one of the ends directly connected to the at least one outer ring.

34. The method as set forth in claim 30 wherein the forming the one or more of the fasteners further comprises forming a plurality of the fasteners which are equidistantly spaced apart between the at least one inner bearing and the at least one outer ring and each of the fasteners has a substantially spiral shape between ends with one of the ends directly connected to the at least one inner bearing and the other one of the ends directly connected to the at least one outer ring.

35. The method as set forth in claim 30 further comprising forming one or more blades that extends out from an outer surface of the outer ring.

36. The method as set forth in claim 30 further comprising forming one or more gear teeth extending out from an outer surface of the outer ring.

37. The device as set forth in claim 36, wherein the one or more gear teeth are configured to move the at least one outer ring upon being struck by a fluid.

38. The method as set forth in claim 30 wherein the forming the inner bearing, forming the outer ring and forming the one or more of the fasteners further comprises etching the inner bearing, outer ring, and the one or more of the fasteners from a substrate.

39. The method as set forth in claim 30 further comprising forming a housing assembly with a shaft on which the inner bearing is seated for rotational movement within the housing assembly.

40. The method as set forth in claim 30 wherein the forming at least one inner bearing further comprises forming at least one inner bearing to have an inner periphery with a circular shape.

* * * * *